(12) United States Patent
Lavertu et al.

(10) Patent No.: US 9,868,089 B2
(45) Date of Patent: *Jan. 16, 2018

(54) SYSTEM FOR CONTROLLING EMISSIONS OF ENGINE AND RELATED METHOD AND NON-TRANSITORY COMPUTER READABLE MEDIA

(71) Applicant: GENERAL ELECTRIC COMPANY, Schenectady, NY (US)

(72) Inventors: Thomas Michael Lavertu, Clifton Park, NY (US); Venu Gummadavelli Gupta, Fairview, PA (US); Shishir Tiwari, Erie, PA (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,675

(22) Filed: Dec. 13, 2016

(65) Prior Publication Data

US 2017/0088070 A1    Mar. 30, 2017

Related U.S. Application Data

(63) Continuation-in-part of application No. 14/336,483, filed on Jul. 21, 2014, now Pat. No. 9,518,521.

(51) Int. Cl.
*F02D 41/14* (2006.01)
*B01D 53/94* (2006.01)
(Continued)

(52) U.S. Cl.
CPC ....... *B01D 53/9495* (2013.01); *B01D 53/944* (2013.01); *F01N 3/021* (2013.01);
(Continued)

(58) Field of Classification Search
CPC .. F02D 41/26; F02D 41/1444; F02D 41/1439; F02D 41/1486; F02D 41/0235;
(Continued)

(56) References Cited

U.S. PATENT DOCUMENTS 6,378,359 B1    4/2002  Dobson et al.
7,603,226 B2   10/2009  Henein
(Continued)

FOREIGN PATENT DOCUMENTS

GB    2501930 A     11/2013
JP    2002332899 A  11/2002
JP    3864723 B2    1/2007

OTHER PUBLICATIONS

Wahono et al., "Diesel engine optimization control methods for reduction of exhaust emission and fuel consumption", Journal of the System Integration (SII), 2012 IEEE/SICE International Symposium on Dec. 16-18 2012, pp. 722-727.

(Continued)

*Primary Examiner* — Hung Q Nguyen
*Assistant Examiner* — Johnny H Hoang
(74) *Attorney, Agent, or Firm* — Pabitra K. Chakrabarti (57) ABSTRACT

A controller for controlling emission of an internal combustion engine, that is configured to: determine an aging parameter(s) of the engine over a period of time; control an operating parameter(s) of the engine, based on the aging parameter(s); and then maintain emissions from the engine at a substantially constant value, based on the controlling. Also method of controlling emissions of an engine comprises: over a time period, determining a change in operating hours of the engine; emissions of the engine; and/or quantity of a fuel being dispensed by a fuel nozzle; controlling an operating parameter(s) of the engine during the time period, based on the determining, thereby maintaining the emissions (Continued)

of the engine substantially at a constant level during the same time period. A system and non-transitory computer readable media for controlling emissions of an engine are also disclosed.

22 Claims, 4 Drawing Sheets

(51) Int. Cl.
| | |
|---|---|
| *F01N 3/021* | (2006.01) |
| *F02D 41/26* | (2006.01) |
| *F02D 41/02* | (2006.01) |
| *F01N 3/035* | (2006.01) |
| *F02D 41/24* | (2006.01) |
| *F02D 41/38* | (2006.01) |
| *F02D 41/40* | (2006.01) |
| *F02D 41/00* | (2006.01) |

(52) U.S. Cl.
CPC ......... *F01N 3/035* (2013.01); *F02D 41/0235* (2013.01); *F02D 41/1444* (2013.01); *F02D 41/2487* (2013.01); *F02D 41/2493* (2013.01); *F02D 41/26* (2013.01); *F02D 41/0007* (2013.01); *F02D 41/1441* (2013.01); *F02D 41/3836* (2013.01); *F02D 41/40* (2013.01); *F02D 2200/0614* (2013.01)

(58) Field of Classification Search
CPC ...... F02D 2200/0614; F01N 3/10; F01N 3/20; F01N 3/21; F01N 3/035; F01N 9/00; F01N 11/00; B01D 46/0027; B01D 46/46; B01D 53/944; B01D 53/9495; B60R 16/0236

USPC .......... 123/434–436, 690; 701/108, 109, 114
See application file for complete search history.

(56) References Cited

U.S. PATENT DOCUMENTS

| | | | |
|---|---|---|---|
| 8,103,429 B2 | 1/2012 | Sivasubramaniam et al. | |
| 8,266,891 B2 | 9/2012 | Soliman et al. | |
| 8,527,183 B2 | 9/2013 | Gallagher et al. | |
| 8,588,999 B2 | 11/2013 | Hall et al. | |
| 2003/0221655 A1* | 12/2003 | Surnilla | F01N 3/0814 123/198 F |
| 2006/0236680 A1* | 10/2006 | Zhang | F01N 3/0231 60/286 |
| 2009/0158706 A1 | 6/2009 | Sun | |
| 2010/0076668 A1 | 3/2010 | Kogo et al. | |
| 2011/0208408 A1 | 8/2011 | Haskara et al. | |
| 2012/0216533 A1 | 8/2012 | Schaffeld et al. | |
| 2012/0221223 A1 | 8/2012 | Schaffeld et al. | |
| 2013/0104529 A1* | 5/2013 | Takayanagi | F01N 3/035 60/297 |
| 2014/0047817 A1* | 2/2014 | Vigild | F01N 3/00 60/273 |
| 2015/0204258 A1* | 7/2015 | Kumar | F01N 11/007 60/274 |

OTHER PUBLICATIONS

Menon et al., "Detection of Surge Precursors in Locomotive Turbocharger", Journal of the Industrial Technology, 2006. ICIT 2006. IEEE International Conference on Dec. 15-17, 2006, pp. 3067-3071.

* cited by examiner

SYSTEM FOR CONTROLLING EMISSIONS OF ENGINE AND RELATED METHOD AND NON-TRANSITORY COMPUTER READABLE MEDIA

CROSS REFERENCE TO RELATED APPLICATIONS

This application is a continuation-in-part of U.S. patent application Ser. No. 14/336,483 entitled "SYSTEM FOR CONTROLLING EMISSIONS OF ENGINE AND RELATED METHOD AND NON-TRANSITORY COMPUTER READABLE MEDIA".

BACKGROUND

Embodiments of the invention relate generally to engines. More particularly, embodiments of the invention relate to systems and methods for controlling emissions of an engine.

Improving fuel efficiency while meeting emission regulations is an ongoing effort in the design of internal combustion engines, for example, diesel engines. Typically, manufacturers make efforts to develop engines that meet the emission regulations through-out the useful life of the engines. Currently, in order to meet the emission regulations, an engine is developed with a margin to allow for the deterioration of the emissions through-out the useful life of the engine. For example, at the beginning of the useful life of the engine (e.g., when the engine is manufactured), the engine is configured to produce emissions at a much lower level than specified in the emission regulations. Such designs allow the emissions of the engine to deteriorate till the end of the useful life of the engine, so that the engine's emissions at the end of the useful life also meet the emission regulations. However, designing a new engine with such low emission levels in order to account for the end of the useful life emissions' deterioration is generally accompanied by increased fuel consumption.

Therefore, there exists a need for a system that aids in lowering the fuel consumption of the engine while meeting the emission regulations throughout the useful life of the engine.

BRIEF DESCRIPTION

One embodiment of the invention is directed to a controller for controlling emission of an internal combustion engine, the controller is configured to: determine at least one aging parameter of the engine over a period of time; control at least one operating parameter of the internal combustion engine, based on the at least one aging parameter; and maintain emissions from the internal combustion engine at a substantially constant value, based on the controlling.

Yet another embodiment of the invention is directed to a method of controlling emissions of an engine comprising: over a time period, determining a change in at least one of: operating hours of the engine; emissions of the engine; and quantity of a fuel being dispensed by a fuel nozzle; controlling at least one operating parameter of the engine during the time period, based on the determining, thereby maintaining the emissions of the engine substantially at a constant level during the time period.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

The present disclosure may be best understood with reference to the figures and detailed description set forth herein. Various embodiments are discussed below with reference to the figures. However, those skilled in the art will readily appreciate that the detailed description given herein with respect to these figures is just for explanatory purposes as the system extends beyond the described embodiments.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. Here and throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

The following terms, unless otherwise indicated, shall be understood to have the following meanings:

The term "engine" as used herein refers to a machine that converts one form of energy (for example, chemical energy) into mechanical energy so as to produce motion. Various examples of the engine include, but are not limited to, internal combustion engines and external combustions engines. Although various embodiments of the present invention have been illustrated with an example of an internal combustion engine, such as, a diesel engine, the embodiments are applicable to other types of engines without limiting the scope of the present description.

The term "emissions" as used herein refers to the level of one or more pollutants contained in an exhaust gas of the engine. The pollutants contained in the exhaust gas of the engine may include, but are not limited to, particulate matter (PM), nitrogen oxides ($NO_X$), carbon dioxide ($CO_2$), carbon monoxide (CO), sulphur dioxide ($SO_2$), hydrocarbons (HC), or combinations thereof.

The term "operating hours" as used herein refers to the number of hours for which the engine is operated since the time the engine is manufactured or from the time the engine first goes into operation.

The term "useful life of engine" as used herein refers to a time period during which the engine is to be operated while meeting emissions regulations. For example, for a locomotive engine (e.g., one type of Tier-4 locomotive engine), the useful life of the engine is considered to be 10 years or an operating hour metric of 33750 megawatt hours, whichever is reached earlier based on a relevant US EPA regulation. It is apparent to a person of ordinary skill in the art that the other types of engine may have different useful lives.

The term "aging parameter" as used herein refers to a parameter that is indicative of an aging of the engine. Various examples of the aging parameter include, but are not limited to, the operating hours of the engine, change in emissions (e.g., PM emissions), or deviation in a quantity of a fuel being dispensed by a fuel nozzle.

The term "operating parameter" as used herein refers to a parameter that directly or indirectly affects one or more performance characteristics of an engine, including, but not limited to, the emissions, power, speed, or fuel consumption. Various examples of the operating parameter include, but are not limited to, injection timing, intake oxygen concentration, oxygen to fuel ratio, quantity of fuel to be injected, fuel injection pressure, injection pattern, or a cylinder pressure.

The term "target limit" as used herein refers to a threshold value beyond which the level of a pollutant is considered unacceptable. Generally, the target limits corresponding to various pollutants are determined in accordance with the emission regulations of a particular country/region.

The term "deviation" as used herein refers to a difference between a measured value and an expected value.

The term "injection timing" as used herein refers to injection start timing, injection duration, injection stop timing, or combinations thereof.

The term "injection start timing" as used herein refers to a position of a crankshaft at which a fuel injection command is initiated for a given cylinder. The injection start timing may be expressed in degrees of rotation before a top-dead-center (TDC) position of a piston in the given cylinder.

The term "injection duration" as used herein refers to the time duration for which the fuel injection is continued after the injection start timing. The injection duration may be indicative of an injected fuel quantity.

The term "injection stop timing" as used herein refers to a position of the crankshaft at which a command for stopping the fuel injection is initiated.

The term "intake oxygen concentration" as used herein refers to a percentage of oxygen in intake passage flow.

The term "emissions from the engine are maintained to be substantially constant" as used herein refers to, for a given pollutant in the exhaust gas of the engine, a level of emission that may vary up-to 5% from a level of emission that is configured at the beginning of the useful life of the engine.

The term "scheduled maintenance events" as used herein refers to a pre-determined maintenance event for an engine and/or vehicle having the engine therein. For example, but without limitation, a scheduled maintenance event could be an oil change (e.g., for locomotive after approximately 6 months of operation), a fuel injector change (e.g., for locomotive in the approximately 18-36 month of operation time range), an engine overhaul, and the like.

The term "between schedule maintenance events" as used herein may refer to the time period between two scheduled maintenance events. The term as used herein may also refer to the time period between the starting of operation of an engine (new or overhauled) and a scheduled maintenance event.

The terms "Tier 4" and "Tier 4 emissions" as used herein refers to the US EPA Tier 4 emission regulations that fall under 40 CFR Part 1033 and 40 CFR Part 104; and specifically to the, de facto, emissions regulations for locomotives found in Subpart B, Part 1033.101 and the marine Tier 4 emissions are found in Subpart 1042. The full regulations are currently found on-line at: http://www.ecfr.gov/cgi-bin/text-idx?SID=a13ea9c2e697b7149e065794ac7fc53d&mc=true&node=pt40.36.1033&rgn=div5.

Some embodiments of the invention are directed to a system for controlling emissions of an engine. The system includes a controller to determine one or more aging parameters of the engine, and to control one or more operating parameters of the engine, at least, based on the one or more aging parameters, such that the emissions from the engine are maintained to be substantially constant during a useful life of the engine.

Figure 1A:
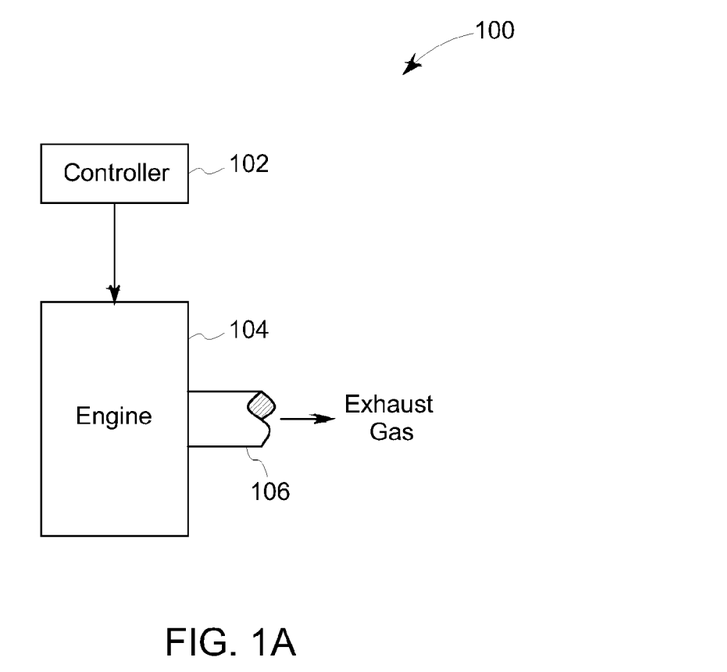
FIG. 1A illustrates a block diagram of a system for controlling emissions of an engine, in accordance with one embodiment of the invention.

FIG. 1A illustrates a block diagram of a system 100 for controlling emissions of an engine, in accordance with one embodiment of the invention. The system 100 includes a controller 102 operably coupled to an engine 104. For example, the engine 104 may be a diesel engine such as a locomotive engine, a truck engine, an Off-Highway Vehicle (OHV) engine, a marine engine, a car or light truck engine, and the like. The engine 104 includes an exhaust passage 106 that is configured to emit an exhaust gas from the engine 104 to an outside atmosphere. The exhaust gas may be formed due to the combustion of a fuel inside the engine 104. The exhaust gas may contain various pollutants including, but not limited to, PM, $NO_X$, $CO_2$, CO, $SO_2$, or HC, that constitute the emissions of the engine 104.

In some embodiments of the invention, when the engine 104 is manufactured, the engine 104 may be configured such that emissions from the engine 104 are maintained in a range greater than about 80 percent of a target limit and less than the target limit. Such configuration of the engine 104 may vary with expected design and process variation. As will be appreciated by a person having ordinary skill in the art that the fuel consumption is inversely proportional to the emissions. Therefore, by maintaining the emissions in the range noted above at the beginning of a useful life of the engine 104, a fuel consumption of the engine 104 at the beginning of the useful life may be reduced as compared to the traditional approach of designing the engine 104 such that the emissions are very low at the beginning itself (e.g., below 80% of the target limit). In one embodiment, the engine 104 may be further continuously monitored and controlled by the controller 102 such that emissions are maintained to be substantially constant during the useful life of the engine 104. In some other embodiments of the invention, at the beginning of the useful life, the engine 104 may be configured such that the emission of at least one pollutant, such as, the PM, is maintained in a range greater than about 80 percent of a target limit and less than the target limit. The emission of the PM is then maintained to be substantially constant while the emission of other pollutants may be allowed to increase.

In order to maintain the emissions to be substantially constant, the controller 102 may determine one or more aging parameters including, but not limited to, operating hours of the engine 104, change in emissions (e.g., an increase in the PM emissions), or deviation in a quantity of a fuel being dispensed by a fuel nozzle of the engine 104. The controller 102 may further control one or more operating parameters of the engine 104, at least, based on the one or more aging parameters, such that the emissions from the engine 104 are maintained to be substantially constant during the useful life of the engine 104. The operating parameters that may be controlled by the controller 102 include, but are not limited to, injection timing, intake oxygen concentration, oxygen to fuel ratio, cylinder pressure such as a peak cylinder pressure, quantity of fuel to be injected, fuel injection pressure, injection pattern, or combinations thereof.

Figure 1B:
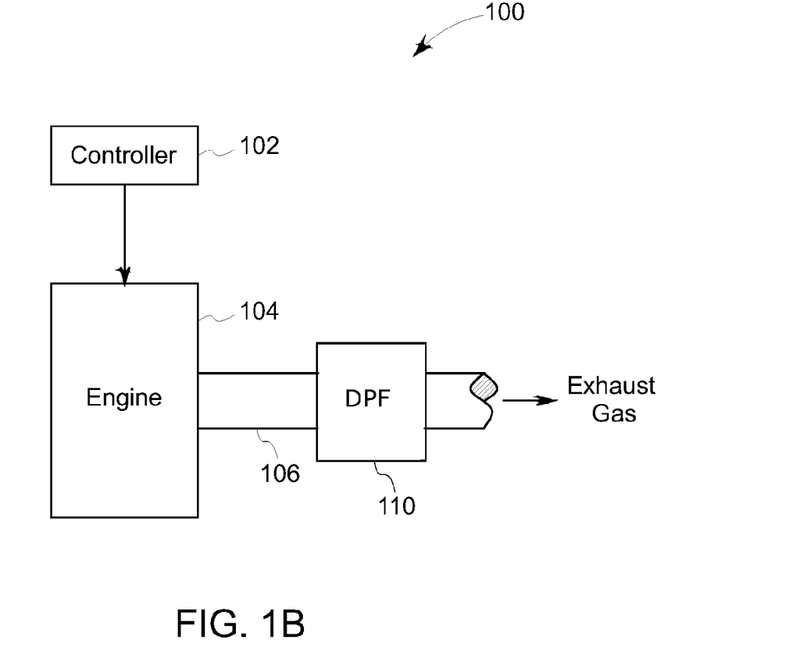
FIG. 1B illustrates a block diagram of a system for controlling emissions of an engine, in accordance with another embodiment of the invention.

As shown in FIG. 1A, an embodiment of the engine system 100 does not include an aftertreatment system of any kind in the exhaust passage 106. In another embodiment, the engine system 100 may include only a Diesel Particulate Filter (DPF) 110 located in the exhaust passage 106, as depicted in FIG. 1B.

Figure 2:
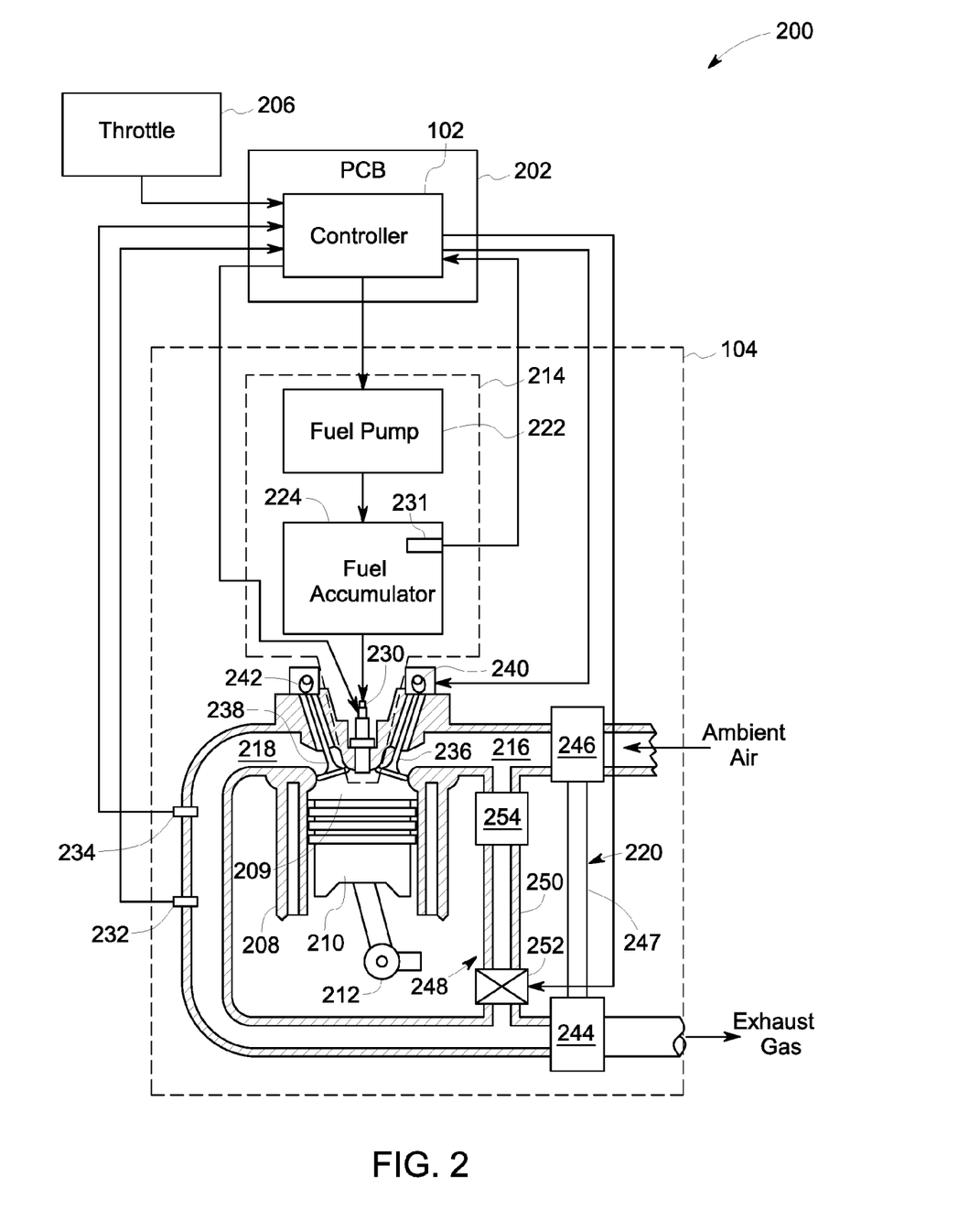
FIG. 2 illustrates a block diagram of a system for controlling emissions of an engine, in accordance with one embodiment of the invention.

FIG. 2 illustrates a block diagram of a system 200 for controlling emissions of the engine 104, in accordance with one embodiment of the invention. The system 200 includes a controller 102, a printed circuit board (PCB) 202, an engine 104, and a throttle 206. The engine 104 may be controlled at least partially by the controller 102.

In one embodiment of the invention, the controller 102 may include a microprocessor, input/output ports, and a storage medium, such as, an electronic memory. Various examples of the microprocessor include, but are not limited to, a reduced instruction set computing (RISC) architecture type microprocessor or a complex instruction set computing (CISC) architecture type microprocessor. Further, the microprocessor may be of a single-core type or multi-core type. The storage medium may store computer readable instructions that are executable by the microprocessor for performing the methods described below as well as other variants that are anticipated but not specifically listed. In some embodiments of the invention, the controller 102 may be mounted on the PCB 202.

The engine 104 includes one or more cylinders. For the sake of brevity, only one cylinder 208 is illustrated hereinafter. The cylinder 208 includes a piston 210 positioned therein. The piston 210 may be coupled to a crankshaft 212 such that a reciprocating motion of the piston 210 is translated into a rotational motion of the crankshaft 212.

Each cylinder, such as the cylinder 208, of the engine 104, may further include an intake valve 236 and an actuator 240 coupled to the intake valve 236. Furthermore, each cylinder, such as the cylinder 208, of the engine 104, may also include an exhaust valve 238 and an actuator 242 coupled to the exhaust valve 238. In the embodiment of FIG. 2, the cylinder 208 is shown including one intake valve 236 and one exhaust valve 238 located at an upper region of the cylinder 208. In some other embodiments of the invention, each cylinder of the engine 104, including cylinder 208, may include two or more intake valves and two or more exhaust valves located at an upper region of the cylinder. In some embodiments of the invention, the actuators 240 and 242 may be of an electric valve actuation type or cam actuation type, or a combination thereof, for example. Further, the opening and closing of the intake valve 236 and the exhaust valve 238 may be controlled concurrently or based on any of variable intake cam timing, variable exhaust cam timing, dual independent variable cam timing, or fixed cam timing.

In one embodiment of the invention, the engine 104 may be a four-stroke engine in which the cylinder 208 fires in a firing order during two revolutions of the crankshaft 212. In another embodiment of the invention, the engine 104 may be a two-stroke engine in which the cylinder 208 fires in a firing order during one revolution of the crankshaft 212. In one embodiment of the invention, the engine 104, when manufactured, is configured such that the emissions from the engine 104 are maintained in a range greater than about 80 percent of the target limit and less than the target limit. Further, the engine 104 may be designed in any of V-series (e.g., V-6, V-8, V-12, etc.), W-series (e.g., W-6, W-8, W-12, etc.), or I-series (e.g., I-4, I-6, I-8, I-12, etc.) configuration, or as a two stroke diesel engine.

The throttle 206 provides a power demand signal that is responsive to an operator's throttle input. For example, for locomotive engines, the throttle input typically includes a plurality of discrete throttle levels that are commonly referred to as notches "N", such as, N1 up to N8, plus an idle setting. In response to the throttle input, the controller 102 adjusts one or more of the operating parameters of the engine 104 to control a speed and a load of the engine 104 to maintain the power demand at a selected notch. The controller 102 may control, for example in some embodiments, fuel injection for controlling the speed and the load of the engine 104 to maintain the power demand at the selected notch.

In some embodiments, the engine 104 further includes a fuel injection system 214. The fuel injection system 214 may include a fuel injection pump 222, a fuel accumulator 224, and a fuel nozzle 230 (for each cylinder). The fuel injection pump 222 may increase the pressure of the fuel received from a fuel tank (not shown). In one embodiment of the invention, the controller 102 controls the fuel injection pump 222 in order to maintain/create a desired pressure of the fuel. The fuel injection pump 222 may be fluidly coupled to the fuel accumulator 224. The fuel injection pump 222 supplies the pressurized fuel to the fuel accumulator 224. The fuel accumulator 224 is fluidly coupled to the fuel nozzle 230. Based on a command signal received from the controller 102, the fuel nozzle 230 may draw a desired amount of the fuel from the fuel accumulator 224 and injects the drawn fuel into the combustion chamber 209 of the cylinder 208. In some embodiments, in each cylinder, including the cylinder 208, of the engine 104, the fuel nozzle 230 may be arranged at a top position as shown in FIG. 2.

In some embodiments of the invention, the fuel injection system 214 may also include a fuel sensor 231. The fuel sensor 231 may be positioned relative to (inside or outside) one or more of the fuel tank, the fuel accumulator 224, or the fuel nozzle 230. The fuel sensor 231 generates a signal (e.g., based on fuel pressure in the fuel accumulator 224) indicative of the amount of the fuel dispensed into the combustion chamber 209. The fuel sensor 231 then sends the generated signal to the controller 102.

In some alternative embodiments of the invention, the controller 102 may determine the amount of the fuel dispensed into the combustion chamber 209 based on an injection duration of the fuel injection by the fuel nozzle 230.

The engine 104 further includes an intake passage 216 that receives an ambient air from an air filter (not shown) that filters air from outside of the engine 104. The intake passage 216 supplies an intake air for aiding combustion in the cylinder 208. The supply of the intake air to the cylinder 208 is controlled by the intake valve 236. Opening and closing of the intake valve 236 may be controlled by the controller 102 via the actuator 240.

The engine 104 further includes an exhaust passage 218 that receives combustion residues (e.g., an exhaust gas) from a combustion chamber 209 of the cylinder 208. The supply of the exhaust gas from the cylinder 208 is controlled by the exhaust valve 238. Opening and closing of the exhaust valve 238 may be controlled by the controller 102 via the actuator 242. The exhaust passage 218 also includes one or more exhaust gas sensors 234 that may detect various pollutants such as PM, CO, $CO_2$, $NO_X$, $SO_2$, HC, or combinations thereof.

As shown in FIGS. 1A and 2, an embodiment of the engine system 100 is devoid of any aftertreatment system of any kind in the exhaust passage 106. In another embodiment, the engine system 100 may include only a Diesel Particulate Filter (DPF) 110 located in the exhaust passage 106, as depicted in FIG. 1B. In yet another embodiment, there may be a Diesel Oxidation Catalyst (DOC) upstream of the DPF. Other aftertreatment system features may be used in other embodiments.

In some embodiments of the invention, the engine 104 may further include an exhaust gas recirculation (EGR) system 248. The EGR system 248 is configured to route a portion of the exhaust gas from the exhaust passage 218 upstream of the turbine 244 to the intake passage 216 downstream of the compressor 246 of the turbocharger 124. The EGR system 248 includes an EGR passage through which the exhaust gas may be re-circulated to the intake passage 216. The EGR system 248 may also include an EGR valve 252 for controlling an amount of the exhaust gas that is re-circulated from the exhaust passage 218 to the intake passage 216. By introducing the exhaust gas to the cylinder 208 via the intake passage 216, the amount of available intake oxygen for combustion is decreased, thereby reducing the combustion flame temperatures and reducing the formation of $NO_X$. The EGR valve 252 may be an on/off valve controlled by the controller 102, for example. In some embodiments of the invention, the EGR system 248 may further include an EGR cooler 254 to reduce the temperature of the exhaust gas before it enters the intake passage 216. As shown in the example embodiment of FIG. 2, the EGR system 248 is a high-pressure EGR system. In other embodiments of the invention, the engine 104 may additionally or alternatively include a low-pressure EGR system. The low-pressure EGR system may be configured to route the exhaust gas from downstream of the turbine 244 to upstream of the compressor 246.

In one embodiment, the exhaust passage 218 includes an oxygen sensor 232 that detects the oxygen in the air inside the exhaust passage 218 and generates a signal indicative of the amount of an intake oxygen from the intake passage 216. The oxygen sensor 232 then communicates the signal to the controller 102. Various examples of the oxygen sensor 232 include, but are not limited to, a lambda sensor, a linear oxygen sensor, a two-state oxygen sensor, a zirconia sensor, a wideband zirconia sensor, an $NO_X$ sensor, or a titania sensor. For example, the lambda sensor may be configured to measure the air to fuel ratio and generate an electrical signal indicative of the air to fuel ratio. After the electrical signal is generated, the lambda sensor may communicate the electrical signal to the controller 102. The controller 102 may then calculate the amount of the intake oxygen. In another embodiment, an oxygen sensor (not shown) may also be configured in the intake passage 216 to determine the amount of the intake oxygen.

In some embodiments of the invention, the engine 104 also includes a turbocharger 220 coupled to the intake passage 216. The turbocharger 220 may include a turbine 244 and a compressor 246. For example, FIG. 1 depicts the engine 104 with a turbocharger 220 including the compressor 246 arranged in the intake passage 216, and the turbine 244 arranged along the exhaust passage 218. The turbine 244 is operated by a flow of the exhaust gas. The compressor 246 may be at least partially powered by the turbine 244 via a shaft 247. The turbocharger 220 boosts air charge of the ambient air drawn into the intake passage 216 in order to provide greater charge density during combustion to increase power output and/or engine-operating efficiency. Although the embodiment described in FIG. 1 illustrates a turbocharger 220 including a single compressor and a single turbine, in other embodiments the turbocharger 220 may also include multiple turbine and compressor stages or multiple single stage turbines and compressors.

In some embodiments of the invention, when the engine 104 is manufactured, the engine 104 may be controlled via the controller 102 such that the emissions from the engine 104 are maintained in a range greater than about 80 percent of the target limit and less than the target limit. For example, if a target limit for PM emissions as specified in the emission regulations is 0.03 g/hp-hr, the engine 104, may be configured to produce the PM emission at a level of 0.028 g/hp-hr which is below the target limit by less than 7% at the beginning of the useful life of the engine 104. For example in order to configure the PM emission at the level of 0.028 g/hp-hr, depending on a notch level at which the engine 104 operates, one or more of the operating parameters may be set at suitable values.

More particularly, in one embodiment of the invention, the engine 104 may be configured to produce PM emissions lower than the value (e.g., 0.028 g/hp-hr) mentioned above. For example, an engineering limit for the PM emissions may be set at a value of 0.024 g/hp-hr such that even after a small deterioration in the PM emission, the PM emission level are maintained below 0.03 g/hp-hr. For example, a lower PM emission (e.g., 0.024 g/hp-hr) may be helpful to account for a variation up-to 0.006 g/hp-hr in the PM emissions. Similarly, if the engine is configured to produce the PM emission at 0.028 g/hp-hr, any variations up-to 0.002 g/hp-hr may be addressed.

In contrast, in the traditional engine design, the engines are developed to produce the PM emissions for overall duty cycle at much lower levels, such as, ~0.02 g/hp-hr.

As will be appreciated by a person of ordinary skill in the art that an engine 104 designed in accordance with the embodiments of the invention, leads to reduced fuel consumption at the beginning of the useful life of the engine 104 as compared to the engines designed with the traditional design. Although, the above example is described with respect to the emission level of the PM, embodiments of the invention are equally applicable to other pollutants contained in the exhaust gas of the engine 104.

Once the engine 104 is configured to produce the emissions at the desired levels as described above, the controller 102 may monitor the engine 104 to determine one or more aging parameters during the useful life of the engine 104. The controller 102 may determine the aging parameters, including but not limited to, the operating hours of the engine 104, the increase in emissions (e.g., PM emission levels in the exhaust gas), or the deviation in a quantity of the fuel being dispensed by the fuel nozzle 230.

In some embodiments of the invention, the controller 102 may continuously update a monitoring mechanism depending on the number of hours the engine 104 is operated. The count maintained by the monitoring mechanism may be indicative of the number of hours the engine 104 is operated. In one example, the monitoring mechanism may include a counter that is being updated by the controller 102 depending on the number of hours the engine 104 operates.

In some embodiments of the invention, the controller 102 is configured to receive the signal(s) indicative of those generated by the one or more exhaust gas sensors 234. The signals received from the one or more exhaust gas sensors 234 may be indicative of instantaneous levels of respective pollutants. In one embodiment, the controller 102 may be configured to receive a signal indicative of the PM emissions from the one or more exhaust gas sensors 234. The controller 102 may also maintain a first look-up table that stores expected levels of various pollutants (e.g., PM emissions) with respect to number of the operating hours of the engine 104. Alternatively, the controller 102 may determine an expected level of a particular pollutant by applying a first transfer function. The first transfer function may be a function of at least the operating hours of the engine 104. The controller 102 may then determine any change in the measured instantaneous value with respect to the corresponding expected level. An amount of change such as increase in the emissions may be indicative of a wear of various constituents of the engine 104 including, but not limited to, the wear of the piston 210, piston rings, the fuel nozzle 230, and inner walls of the cylinder 208.

In some embodiments of the invention, the controller 102 may be configured to receive a signal indicative of the quantity of the fuel being dispensed by the fuel nozzle 230 from the fuel sensor 231. The controller 102 may determine the quantity of the fuel being dispensed by the fuel nozzle 230 based on the signal received from the fuel sensor 231. The controller 102 may also maintain a second look-up table that stores expected quantities of the fuel that is to be dispensed by the fuel nozzle 230 with respect to the number of operating hours of the engine 104. Alternatively, the controller 102 may determine an expected quantity of the fuel that is to be dispensed by the fuel nozzle 230 by applying a second transfer function. The second transfer function may be a function of at least the operating hours of the engine 104. The controller 102 may then determine an amount of deviation between the determined quantity of the fuel being dispensed and the corresponding expected quantity of the fuel. The amount of the deviation may be indicative of the wear of the fuel nozzle 230.

After the aging parameters are determined, the controller 102 adjusts the operating parameters, may be throughout the useful life of the engine 104, such that the emissions from the engine 104 are maintained to be substantially constant about a level which is set at the beginning of the useful life of the engine 104. Referring back to the previous example, the controller 102 may adjust the operating parameters such that the PM emission level is maintained substantially constant at the level of 0.028 g/hp-hr during the useful life of the engine 104. Whereas in the traditional design approaches, the initially set emission level is allowed to deteriorate up-to a value that is lower than the target limit by end of the useful life of the engine. Therefore, it is apparent that the engine 104 has reduced fuel consumption as compared to the engines designed with traditional design approaches.

The controller 102 may adjust the operating parameters, such as, the injection timing, the intake oxygen concentration, the oxygen to fuel ratio, the quantity of fuel to be injected, the fuel injection pressure, the injection pattern, or combinations thereof. In some embodiments, the controller 102 may determine the amount of the variation to be effected in the operating parameters based on the determined values/levels of the aging parameters. For example, if the controller 102 determines that the PM emission level is increased due to wear of the constituents of the engine 104, the controller 102 may vary one or more of the operating parameters depending on the amount by which the PM emission is increased. For example, the controller 102 may retard the injection start timing in order to reduce the PM emissions at the selected notch. The controller 102 controls the injection timing (e.g., the injection start timing) by sending a command signal to the fuel nozzle 230. A solenoid may then be activated to initiate fuel injection based on the command signal from the controller 102. Alternatively, the controller 102 may also increase the oxygen to fuel ratio in order to reduce the PM emissions at the selected notch. In one embodiment of the invention, in order to increase the oxygen to fuel ratio, the controller 102 may increase a duration for which the intake valve 236 remains open so as to allow more air to be supplied to the combustion chamber 209. In an alternative embodiment of the invention, in order to increase the oxygen to fuel ratio, the controller 102 may increase the intake manifold pressure by controlling a bypass flow of air around the turbine 244. In some embodiments when the turbocharger 220 is a two stage turbocharger having a high pressure turbine and a low pressure turbine, the controller 102 may increase the intake manifold pressure by controlling the bypass flow of air around the high pressure turbine. In another alternative embodiment of the invention, in order to increase the oxygen to fuel ratio, the controller 102 may delay the injection start timing. In yet another embodiment of the invention, other components such as a variable geometry turbine (VGT) (not shown) may also be used to control a manifold air pressure (MAP). Consequently, the oxygen to fuel ratio is also controlled. It is to be noted that in some embodiments of the invention, the controller 102 may modify the operating parameters while maintaining other emissions (more particularly, $NO_X$) within their respective target limits.

Referring again to the example of the basic notch-8 operation, as alluded to previously, as the engine 104 ages or due to an increase in the temperature of intake passage 216, the PM emissions also increase. Therefore, in case of the traditional design, further reduction in PM emission level may not be effected without compromising on the fuel consumption. In such instances, it may be difficult to adjust the operating parameters such as the injection timing and the intake oxygen concentration without increasing the fuel consumption. Whereas, in accordance with some embodiments of the present invention, in order to maintain the PM emission level to be substantially constant at 0.028 g/hp-hr, the controller 102 may control the injection start timing and the intake oxygen concentration. More particularly, in accordance with some embodiments of the invention, the fuel consumption at the beginning of the useful life of the engine 104 is substantially reduced as compared to the traditional design.

In some embodiments of the invention, the system 200 may also facilitate resetting of the operating parameters after an overhaul of the engine 104. In order to aid the resetting of the operating parameters, the system 200 may further include a reset button and/or a user interface that facilitates a user to feed information into the controller 102. In one embodiment of the invention, the reset button and/or the user interface may be mounted on the PCB 202. In another embodiment of the invention, the reset button and/or the user interface may be mounted external to the PCB 202. In yet another embodiment of the invention, the reset button and/or the user interface may be of a plug and play type configuration that may be connected to the controller 102 when required (e.g., when reset is to be performed after the overhaul). The controller 102 is further configured to reset one or more of the operating parameters to a corresponding determined value on receiving a reset signal. The reset signal may be received from the reset button and/or a user interface.

In accordance with some of the embodiments of the invention, by controlling of emissions, based on the aging of the engine 104, the emissions values are maintained to be substantially constant at the levels set at the beginning of the useful life of the engine. This substantially constant level of the emissions may further be controlled based on the running conditions of the engine 104 including, but not limited to, speed, power, load, temperature of the intake air, pressure of the fuel being injected, altitude, and so forth, without limiting the scope of the present description.

Some embodiments of the invention are directed to a method for controlling emissions of an engine 104. The method includes determining one or more aging parameters of the engine 104. The method further includes controlling one or more operating parameters of the engine 104 at least, based on the one or more aging parameters, such that the emissions from the engine 104 are maintained to be substantially constant during a useful life of the engine 104.

Figure 3:
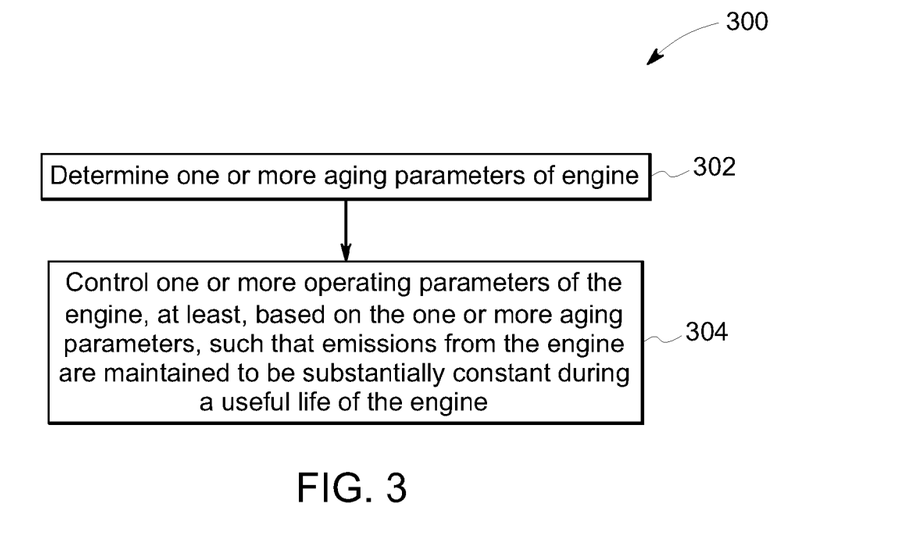
FIG. 3 illustrates a flowchart of a method for controlling emissions of an engine, in accordance with one embodiment of the invention.

FIG. 3 illustrates a flowchart 300 of a method for controlling the emissions of the engine 104, in accordance with one embodiment of the invention. The flowchart 300 is explained in conjunction with FIGS. 1A, 1B and 2. As discussed earlier, in some embodiments of the invention, when the engine 104 is manufactured, an operator configures the engine 104 via the controller 102 such that the emissions from the engine 104 are maintained in a range greater than about 80 percent of a target limit and less than the target limit.

At step 302, the one or more aging parameters of the engine 104 are determined by the controller 102. Examples of the aging parameters include, but are not limited to, the operating hours of the engine 104, the increase in the emissions (e.g., PM levels in the exhaust gas), or the deviation in the quantity of the fuel being dispensed by the fuel nozzle 230. The determination of the one or more aging parameters may include determining the operating hours of the engine 104 by the controller 102. The determination of the one or more aging parameters further includes receiving a signal indicative of the PM emissions from the one or more exhaust gas sensors 234 and receiving a signal indicative of the quantity of the fuel being dispensed by the fuel nozzle 230 from the fuel sensor 231. The controller 102 then determines the increase in the emissions based on the signals received from the one or more exhaust gas sensors 234. Similarly, the controller 102 determines the deviation in the quantity of the fuel being dispensed by the nozzle 230 based on the signal received from the fuel sensor 231.

The method further includes, at step 304, controlling the one or more operating parameters, at least, based on the aging parameters such that emissions from the engine 104 are maintained to be substantially constant during a useful life of the engine 104.

Furthermore, the method includes resetting one or more of the operating parameters to a corresponding determined value on receiving a reset signal.

Figure 4:
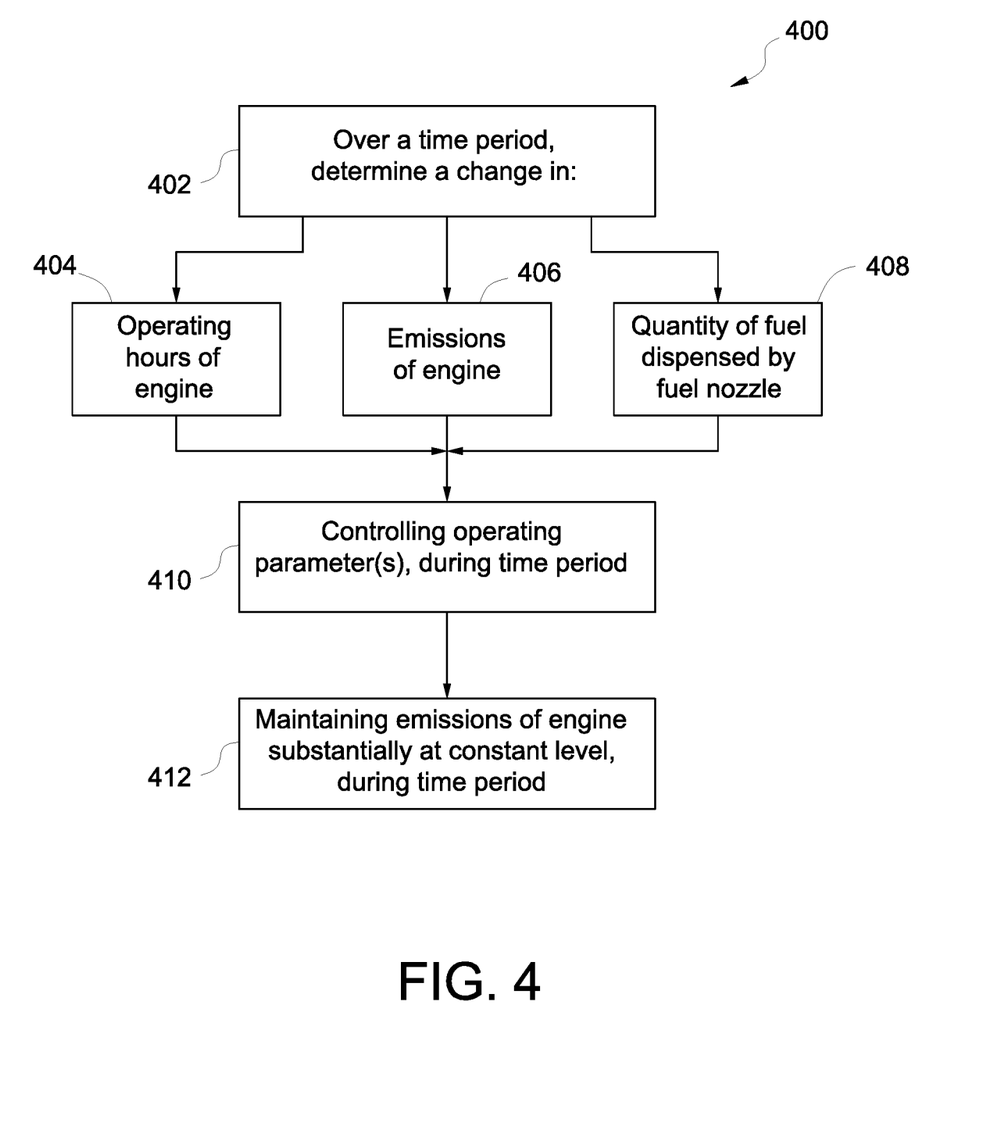
FIG. 4 illustrates a flowchart of a method for controlling emissions of an engine, in accordance with another embodiment of the invention.

FIG. 4 illustrates a flowchart 400 of a method for controlling the emissions of the engine 104, in accordance with another embodiment of the invention. The flowchart 400 is explained in conjunction with FIGS. 1A, 1B and 2. As discussed earlier, in some embodiments of the invention, when the engine 104 is manufactured, an operator configures the engine 104 via the controller 102 such that the emissions from the engine 104 are maintained in a range greater than about 80 percent of a target limit and less than the target limit.

At 402, the controller 102 of the engine 104 determines, over a time period, a change in at least one of: 404 operating hours of the engine 104; 406 emissions of the engine 104; and/or 408 a quantity of fuel dispensed by a fuel nozzle(s). At 410, the controller 102 controls one or more operating parameters of the engine, during the time period, based on the determining (i.e., 402/404, 402/406, 402/408, or combinations thereof). In controlling, at 412 the controller 102 is thereby able to maintain emission of the engine substantially at a constant level, during the time period.

Any of the foregoing steps and/or system elements may be suitably replaced, reordered, or removed, and additional steps and/or system elements may be inserted, depending on the needs of a particular application, and that the systems of the foregoing embodiments may be implemented using a wide variety of suitable processes and system elements and are not limited to any particular computer hardware, software, middleware, firmware, microcode, etc.

Furthermore, the foregoing examples, demonstrations, and method steps such as those that may be performed by the system may be implemented by suitable code on a processor-based system, such as a general-purpose or special-purpose computer. Different implementations of the systems and methods may perform some or all of the steps described herein in different orders, parallel, or substantially concurrently. Furthermore, the functions may be implemented in a variety of programming languages, including but not limited to C++ or Java. Such code may be stored or adapted for storage on one or more tangible or non-transitory computer readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The non-transitory computer readable media stores an executable code to perform method of determining the one or more aging parameters of the engine 104 and controlling one or more operating parameters of the engine 104, at least, based on the one or more aging parameters, such that emissions from the engine are maintained to be substantially constant during a useful life of the engine 104.

In accordance with some embodiments of the invention, the described systems and techniques may result in the reduced fuel consumption of the engine. This may be effected in part as engine's emissions are set at higher levels (substantially close to the target limits) but within the target limits at the beginning of the useful life and maintained substantially constant at this level during the useful life of the engine.

The present invention has been described in terms of some specific embodiments. They are intended for illustration only, and should not be construed as being limiting in any way. Thus, it should be understood that modifications can be made thereto, which are within the scope of the invention and the appended claims.

Note that the system and methods described herein could be applied to meeting emissions standards, other than the Tier 4 emissions regulations. The constant or target limit may be another pre-determined limit including, for example, a car and light truck limit, trucking limit, and the like. Similarly, the constant or target limit may be a regulatory or physical emissions limit. For regulatory limits (e.g., Tier 4 emissions limit) the regulation need not be US-based. For example, the regulatory limit may be a European, Asian, regional, or country-specific regulatory limit.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following claims.

The invention claimed is:

1. A controller for controlling emission of an internal combustion engine, the controller configured to:
    determine at least one aging parameter of the internal combustion engine over a period of time;
    control at least one operating parameter of the internal combustion engine, based on the at least one aging parameter, to maintain emissions from the engine substantially constant over the period of time; and
    reset the at least one operating parameter to a corresponding determined value on receiving a reset signal when the internal combustion engine is overhauled.

2. The controller of claim 1, wherein the internal combustion engine comprises a diesel engine.

3. The controller of claim 2, wherein the diesel engine is configured for one of: a locomotive, a marine vessel, and a truck.

4. The controller of claim 1, wherein the at least one aging parameter comprises operating hours of the engine, change in the emissions, deviation in a quantity of a fuel being dispensed by a fuel nozzle, and combinations thereof.

5. The controller of claim 1, wherein the at least one operating parameter comprises injection timing, intake oxygen concentration, oxygen to fuel ratio, cylinder pressure, quantity of fuel to be injected, fuel injection pressure, injection pattern, and combinations thereof.

6. The controller of claim 1, wherein the substantially constant value comprises a Tier 4 regulations.

7. The controller of claim 1, wherein the period of time comprises a useful life of the internal combustion engine.

8. The controller of claim 1, wherein the period of time comprises between scheduled maintenance events.

9. The controller of claim 1, wherein the period of time comprises less than a year.

10. A system comprising:
    an internal combustion engine; and
    the controller of claim 1.

11. The system of claim 10, wherein the internal combustion engine is configured such that, at the beginning of a useful life of the internal combustion engine, the emissions from the internal combustion engine are maintained in a range greater than about 80 percent of a target limit and less than the target limit.

12. The system of claim 10, wherein an exhaust system of the internal combustion engine is devoid of an aftertreatment system.

13. The system of claim 10, wherein an exhaust system of the internal combustion engine comprises only a Diesel Particulate Filter (DPF).

14. The system of claim 10, wherein an exhaust system of the internal combustion engine comprises a DPF and a Diesel Oxidation Catalyst (DOC).

15. A method of controlling emissions of an engine comprising:
    over a time period, determining a change in at least one of:
        operating hours of the engine;
        emissions of the engine; and
        quantity of a fuel being dispensed by a fuel nozzle;
    controlling at least one operating parameter of the engine during the time period, based on the determining, thereby maintaining the emissions of the engine substantially at a constant level during the time period; and
    resetting the one or more operating parameters to a corresponding determined value on receiving a reset signal when the engine is overhauled.

16. The method of claim 15, wherein the time period comprises a useful life of the engine.

17. The method of claim 15, wherein the constant level comprises a Tier 4 emissions regulation.

18. The method of claim 15, wherein an exhaust system of the engine is devoid of an aftertreatment system.

19. The method of claim 15, wherein an exhaust system of the comprises only a DPF.

20. The method of claim 15, wherein an exhaust system of the comprises only a DPF and a DOC.

21. The method of claim 15, wherein the period of time comprises between scheduled maintenance events.

22. A non-transitory computer readable media storing an executable code to perform the method of claim 15.

* * * * *